United States Patent [19]

O'Lear

[11] 3,904,891

[45] Sept. 9, 1975

[54] LOGIC CIRCUIT FOR TRUE AND COMPLEMENT DIGITAL DATA TRANSFER

[75] Inventor: Robert M. O'Lear, San Diego, Calif.

[73] Assignee: The United States of America as represented by the Secretary of the Navy, Washington, D.C.

[22] Filed: June 25, 1971

[21] Appl. No.: 156,749

[52] U.S. Cl. ........... 307/238; 235/92 CM; 307/218; 307/291

[51] Int. Cl.$^2$ ........................ G06F 3/00; G06F 7/00

[58] Field of Search .................... 307/218, 238, 291; 235/92 CM

[56] References Cited

UNITED STATES PATENTS 3,351,778 11/1967 Seelbach et al. .................... 307/291

*Primary Examiner*—John Zazworsky

*Attorney, Agent, or Firm*—R. S. Sciascia; G. J. Rubens; J. W. McLaren

[57] ABSTRACT

A logic circuit for the transfer of true and complement binary digital bits of information employs "single rail" techniques to eliminate several elements required in prior art "double rail" logic circuits. A J–K flip-flop is arranged to receive each true binary digital bit of data information at both its J and K inputs and upon being clocked produces the "true" output relative to the data input when the J–K flip-flop has been previously put into its "clear" condition, and produces complement outputs when the flip-flop has been previously put in the "set" condition. Simplification of the logic circuit by elimination of a number of elements results in cost savings over comparable prior art circuits and improved speed of operation as well.

4 Claims, 2 Drawing Figures

INVENTOR.
ROBERT M. O'LEAR
BY

INVENTOR.
ROBERT M. O'LEAR
BY

LOGIC CIRCUIT FOR TRUE AND COMPLEMENT DIGITAL DATA TRANSFER

BACKGROUND OF THE INVENTION

In digital computation techniques and equipments it is frequently required that data be stored in an appropriate memory device such as a data register; moreover, such data is often required to be transferred from one memory or storage device to an additional memory or storage device. In order to accomplish functional computations such as subtraction, division, etc. it is required that a "complement" of each data bit be transferred, stored, and made available within the machine organization. For example, the "ones" complement of binary 11010 is 00101 and in a typical binary digital data machine organization it would likely be required to transfer and store such a typical binary representation in complement or true form for availability in further computation as desired.

In the transfer of such multiple bit data information parallel logic circuitry is customarily employed between first and second storage or memory devices such as data registers for instance. For the purpose of disclosing and explaining the present invention, however, as well as comparably functioning logic circuits of the prior art, the transfer of a single bit of information will be explained with the understanding that any desired plurality of such logic circuits may be employed to provide as many parallel paths for the transfer of multiple bit data information as may be required, desired, or necessary in any particular machine organization.

In the prior art, the transfer of true and complement data bits in binary form between a first and second memory device such as first and second registers, for example, was customarily adapted to provide either true or complement data bits at the second memory device relative to the output of the data bits at the first memory device. This function was accomplished conventionally by using only one of the two possible outputs from an R-S flip-flop employed as a first memory device to store one bit of information in a typical data register. In a R-S flip-flop, a binary 1 output is produced when it is in the S condition, and a binary 0 is produced when it is in the R condition. Therefore, a single output can be employed in a "single rail" fashion under the assumption that a lack of a binary 1 output is the equivalent of a binary 0 output and this is what has been done conventionally in the prior art.

Logic circuits employed in the prior art for the transfer of true and complement data bits between first and second memory or storage devices customarily use the single rail output of an R-S flip-flop which is part of a first storage or memory device and split it into "double rail" arrangements for the true and complement data transfer. In one of the two paths provided by the double rail arrangement, the bit of the selected single output of the R-S flip-flop is inverted by an appropriate element such as in inverter gate. Thus, one of the two parallel paths of the double rail arrangement provided a true data bit while the other provided a complement data bit, the latter being the true bit in inverted or opposite form, i.e., a binary 1 became a binary 0 or, alternatively, the input of a binary 0 became a binary 1 as the output of the inversion element.

Each of the two parallel paths was under the control of an enabling signal which allowed either the true or the complement data bit to pass to an OR gate the output of which comprised the main transfer bus of the equipment. The main transfer bus also provided an enabling signal for an AND gate which received the true or complement data bit from the OR gate in accordance with which of the two separate enabling signals connected to the respective true and complement AND gates in the double rail arrangement was previously actuated. Upon the latter AND gate being enabled, it transmitted either a true or complement bit to a second RR–S flip-flop which was a part of the second storage or memory device.

Prior to reception of the data bit from the OR gate, the R–S flip-flop had been cleared by a clear signal connected to its R input. Thus, if the AND gate, which provides the input to the R-S flip-flop of the second storage means was a binary 1 to the S input, the binary 1 would be stored in the R–S flip-flop and provide a binary 1 output; however, if the binary signal was a 0 to the S input of the R–S flip-flop of the second storage or memory device, no change in condition of the R–S flip-flop was caused so that effectively a binary 0 was stored, providing a binary 0 output from the R–S flip-flop of the second storage or memory device.

While such prior art conventional logic circuits as described hereinabove have been employed in digital data computers for a considerable period of years with good results, it will become apparent to those skilled in the art that the commitment of the design of such a logic circuit to at least partial "double rail" techniques, involves a multiplicity of circuit elements which largely determine the cost and complexity of the prior art logic circuit, as well as determining, in part at least, limitations upon its speed of operation.

Accordingly, it is highly desirable to devise logic circuits which can be employed with equal effectiveness as compared to the prior art logic circuit for the transfer of true and complement data between storage or memory devices in computer equipment, but offers the advantage of less complexity, fewer number of elements, making possible cost savings as well as enhanced speed of operation by reason of such reduced number of components.

SUMMARY OF THE INVENTION

For purposes of explanation it may be assumed that the concept of the present invention is adaptable to employ R–S flip-flops as the first storage or memory device from which it is desired to develop either true or complement data bits for storage or retention in a second storage or memory device. The concept of the invention is not specifically limited to the use of R–S flip-flips, but any suitable first storage or memory device may be used. The second storage or memory device of the present invention, however, comprises a J–K flip-flop employed in a manner which will be more fully understood by the explanation which follows. A single binary output is taken from the binary "one" output terminal of the first storage or memory device, such as an R–S flip-flop, and is connected as one of the inputs to an AND gate. The second input to the AND gate is an enabling signal which gates the memory data register to the main transfer bus. Upon being thus enabled. the AND gate provides an output which is connected as the input to both the J and K terminals of the J–K flip-flop which comprises the second memory or storage device.

As is well known to those skilled in the art, the operation of J–K flip-flops is such that if a binary 0 is applied to both the J and K terminals a subsequent clock pulse will leave the flip-flop in its prior state. However, if a binary 1 is applied to both the J and K terminals, a clock pulse will enable the flip-flop so as to produce an output which represents a change of state from that which existed immediately prior to such enabling. That is to say, that if a J–K flip-flop were in a "clear" condition, which is the equivalent of a binary 0, and a binary 1 is applied to both the J and K terminals of the J–K flip-flop, a subsequent clock pulse would produce a change of state to a binary 1 output from the J–K flip-flop. On the other hand, if the flip-flop had previously been in a "set" condition, which is the equivalent of a binary 1, and binary 1's were applied to both the J and K terminals of the J-K flip-flop a subsequent clock pulse enabling the flip-flop would produce a change of state in its output so that it would produce a binary 0 output signal.

By contrast, if binary 0's are connected as the inputs to both J and K terminals of the J–K flip-flop, the flip-flop would remain in its prior condition producing no change of state output signal so that its output would comprise a bin ary 0, or a binary 1 dependent upon whether it had previously been in a "clear" condition or a "set" condition, respectively.

Thus, in accordance with the teaching of the present invention, the J–K flip-flop used as a second storage or memory device to accommodate the transfer of true or complement data bits will develop and store a true data bit when the J–K flip-flop is in the clear condition, but will develop the complement binary data bit when the J–K flip-flop is in the set condition.

This functional performance is achieved in a single rail form of operation, eliminating several components from each of the logic circuits employed to transfer a bit of binary data information. Moreover, the elimination of certain components and reduction of the total number of elements involved in the new logic circuit provides a speedier operation as well as less complexity and a commensurate cost savings. These multiple desiderata are increased in direct proportion to the number of parallel paths used in a particular equipment for such transfer of true and complement data bits from a first storage or memory device to a second storage or memory device.

Accordingly, it is an important object of the present invention to provide a logic circuit for the transfer of true and complement data bits which is less complex than those known in conventional prior art circuits and thus effect a cost savings in the number of elements as well as the number of connections that are required.

Another most important object of the present invention is to provide such a logic circuit for the transfer of true and complement data bits which is inherently capable of speedier operation than was possible with comparable prior art logic circuits.

These and other features, objects, and advantages of the present invention will be better appreciated from an understanding of the operative principles of a preferred embodiment as described hereinafter and as illustrated in the accompanying drawing.

DESCRIPTION OF THE PREFERRED EMBODIMENT

Figure 1:
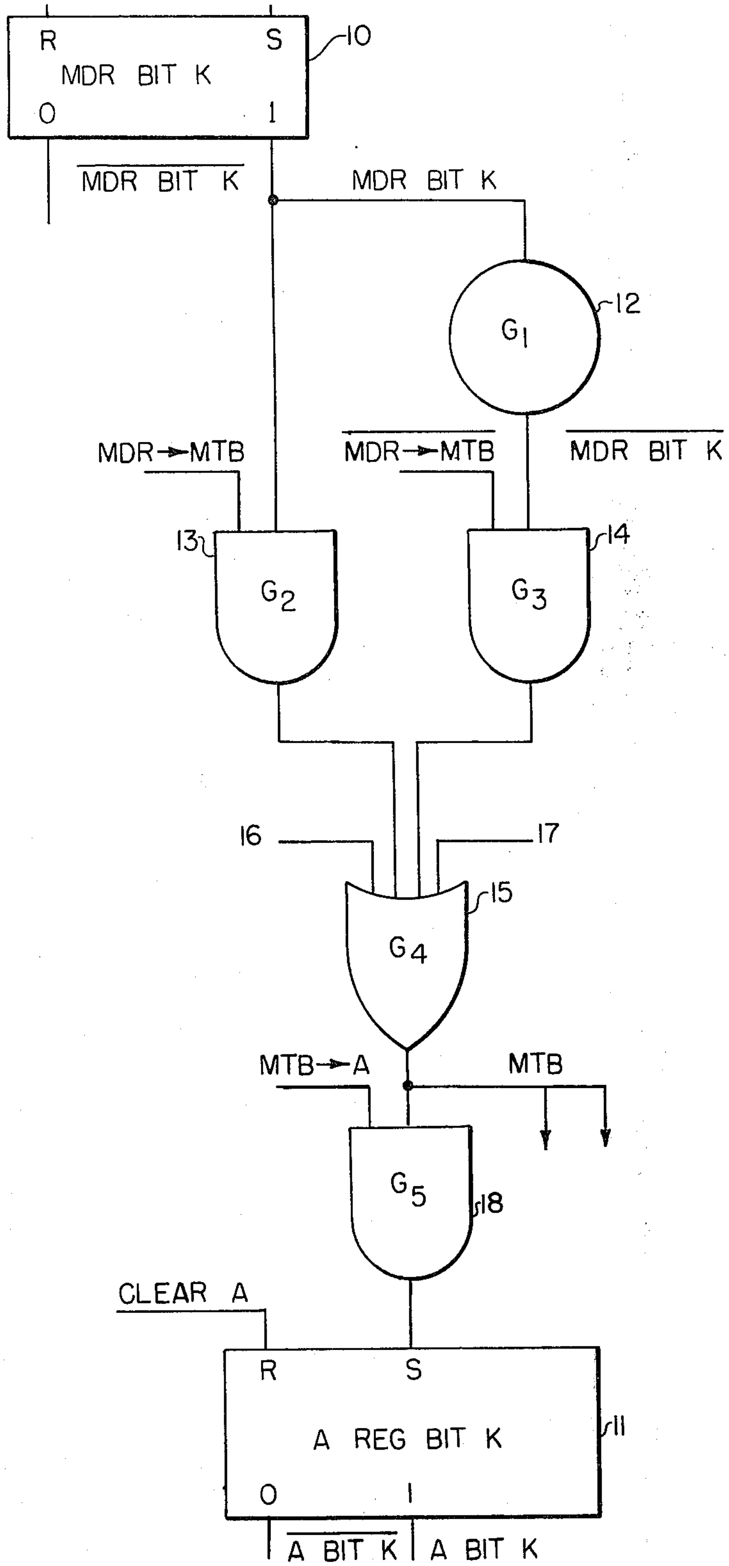
FIG. 1 is a schematic representation of a typical prior art circuit for the transfer of true and complement data between a first storage device and a second storage device.

In order that the present invention be properly understood in the perspective of the pertinent prior art, a prior art logic circuit customarily used to achieve the same or comparable results as those attained with the present invention will be described. FIG. 1 illustrates a true and complement data transfer logic circuit for operating upon a single digital bit, i.e., bit K, for transferring it in either true or complement form, as may be desired, from a first memory or storage device 10 designated as a Memory Data Register or MDR. It is to be understood that the logic circuit illustrated in FIG. 1 represents but a single bit K. Customarily a plurality of such logic circuits are arranged in parallel configuration to transfer multiple bits in accordance with the configuration of the machine organization which may, for example, be an 8 bit, 18 bit, 24 bit, or any number of bits depending upon the particular equipment involved. A second memory or storage device may comprise an A register 11 one bit of which is illustrated in FIG. 1. The first storage or memory device 10, which comprises an R–S flip-flops, provides a 0 or 1 binary signal output for each bit in accordance with whether the input signal is received at the R terminal or the S terminal, respectively. However, in accordance with prior art conventional practices both of the binary outputs comprising a 0 and a 1 are not actually used. Instead, only the binary 1 output is used by being connected to other elements in the logic circuit, it being asssumed when there is no binary 1 output, the output must necessarily be a binary 0. This technique has long been used in order to simplify the complexity of multiple parallel circuits such as the logic circuit illustrated in FIG. 1 and to reduce wiring requirements between the first and second storage and memory devices such as the two registers 10 and 11.

Since only one output of the R–S flip-flop 10 is used, it is called a "single rail" technique or output. The output of the binary "one" terminal of the R–S flip-flop 10 is connected to both an inverting gate 12 and an AND gate 13. Thus, the logic circuit of FIG. 1 becomes a "double rail" arrangement in part, since gate 13 is employed to develop the "true" bit K, while the inverting gate 12 develops the inverted or opposite of true, i.e., the "compelement" bit K which is fed to an AND gate 14.

Second inputs for enabling gates 13 and 14 are provided for gating the memory data register onto a main transfer bus connection, and designated MDR → MTB, and $\overline{\text{MDR} \rightarrow \text{MTB}}$, respectively, in FIG. 1. The outputs of the double rail arrangement comprising the AND gates 13 and 14 are connected to an OR gate 15 and, depending upon whether gate 13 or 14 is enabled by an appropriate input signal, AND gates 13 or 14 provide a true or a complement binary digital bit output which is received in the OR gate 15. Additional inputs may be received in the OR gate 15 on either or both of the parallel connecting inputs 16 and 17. Such inputs depend, however, upon the configuration, purpose and design of the machine organization and are not an integral or necessary part of the transfer of true and complement data.

The true or complement binary bit as received by the OR gate 15 is then connected as the input to an AND gate 18 and also to the main transfer bus, designated as MTB in FIG. 1. An enabling signal causes the AND gate 18 to generate an output signal which is connected to the second storage or memory device 11 in the form of register comprising an R–S flip-flop as illustrated in FIG. 1. Initially an appropriate "clear" signal is received by the R-S flip-flop 11 actuating it to its clear, or 0 binary bit condition. Then the signal generated by AND gate 18 is received at the S input terminal of the R–S flip-flop 11. Thus, if a 0 binary input is received at the S input terminal of the R–S flip-flop 11, the output remains a binary 0. Whereas, if a binary 1 input is received at the S input terminal of the R–S flip-flop 11, its output becomes a binary 1.

The control of whether the true or complement binary bit is stored in the A register 11 is determined by the enabling signal which is applied to either the true AND gate 13 or the complement AND gate 14.

Figure 2:
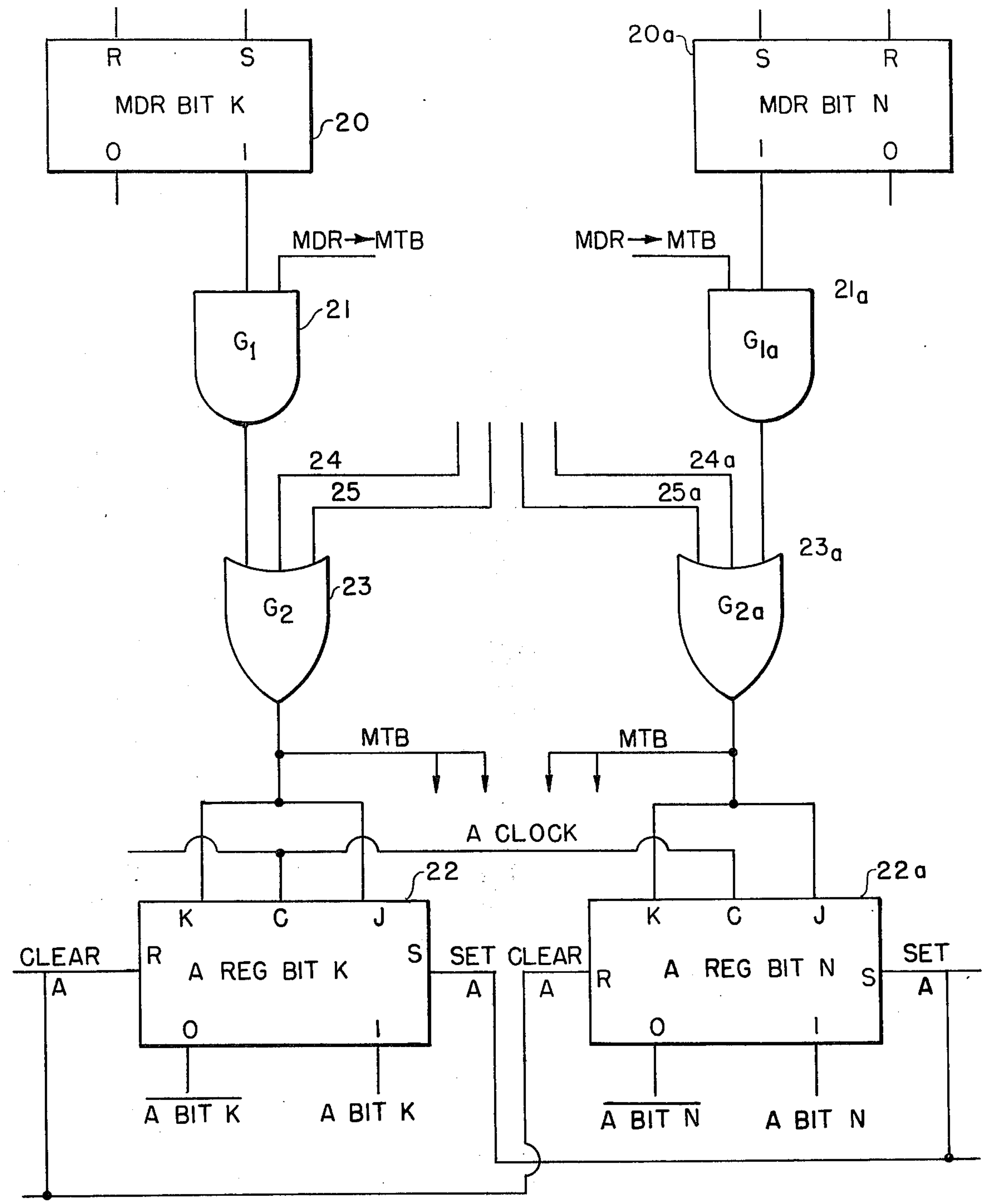
FIG. 2 is a schematic representation of logic circuits of the present invention employed as multiple parallel paths for transferring true and complement data from a first storage memory device to a second storage memory device.

Contrasted to the conventional prior art true and complement digital data transfer logic circuit illustrated in FIG. 1, the illustration of FIG. 2 presents an embodiment of the present invention in schematic form. A first memory or storage device 20, labled MDR, for "memory data register," a portion of which operates upon bit K as indicated in the drawing is substantially the same as the memory or storage device 10 illustrated in FIG. 1 of the prior art logic circuit, as included in the present invention, each such bit similarly provides a single rail output.

However, the output for bit K of the storage register 20 is connected as one input to an AND gate 11. The second input to the AND gate 21 is an enabling signal which enables the memory data register MDR to the main transfer bus MTB, as indicated in FIG. 2. The AND gate 21, when enabled by an appropriate signal, produces an output which is connected as the input signal to both the J and K terminals of a J–K flip-flop 22, comprising bit K of the second memory or storage device labled the A register, and comparable to the A register 11 of FIG. 1.

The output of the AND gate 21 may, as is illustrated in FIG. 2, be connected through an OR gate 23 to impress its signals upon the J and K input terminals of the J–K flip-flop 22, though this is not necessary to the concept of the present invention. However, as shown in FIG. 2 the insertion of the OR gate 23 between the output of the AND gate 21 and the input terminals J and K of the J–K flip-flop 22 afford a means of accepting additional input signals through the connections 24 and 25 which accommodate additional inputs for the OR gate 23. The output of the OR gate 23 may also be connected to the main transfer bus, MTB, as shown for convenient connection to other elements and components of the system. The J–K flip-flop 22 is connected to an appropriate clock signal by means of which it is actuated and is also connected to receive either a "clear" signal or a "set" signal at the R and S inputs, respectively. The stored true or complement bit K is produced by J–K flip-flop 22 as either a binary 1 or the absence of a binary 1 to be interpreted as a binary 0 at the output connection marked "A bit K" in FIG. 2.

OPERATION

The operation of the digital data true and complement transfer logic circuit as illustrated in FIG. 2 will be described as it functions to produce true binary bit outputs and then as it functions to produce complement binary outputs. If the true binary bit output is desired to be stored in the second register or storage means 22, a "clear" signal is applied to each such J–K flip-flop which places it in the clear condition so that its output will be a binary 0 unless changed by its inputs.

Accordingly, if the true binary bit output of the memory data register 20 is a binary 1, gate 21, upon being enabled by an appropriate signal transmitted on the main transfer bus from the memory data register, will produce a binary 1 output which is in turn impressed upon the OR gate 23, and subsequently received at both the J and K terminals of the J–K flip-flop 22. It will be recalled that the J–K type of flip-flop operates so that if a binary 1 is received at both the J and K inputs, the flip-flop will change its state. That is to say, from a binary 0 to a binary 1, or, if it preexisted in the binary 1 output condition, it will change from the preexisting binary 1 to a binary 0 condition. The characteristic of the J–K flip-flop is, however, that it is not responsive to two binary 0 inputs at the J–K input terminals. Accordingly, when the binary 1 input is received at both the J and K input terminals, the cleared or binary 0 output changes to a binary 1 so that the true binary bit is transferred from the binary data register 20 to the second memory or storage device J–K flip-flop 22.

On the other hand, if the true output of the memory data register 20 is a binary 0, that signal will be transmitted to the AND gate 21, and, upon the AND gate 21 being enabled by an appropriate main transfer bus signal from the memory data register, a binary 0 output will be received at the OR gate 23 and transmitted to both the J and K input terminals of the J–K flip-flop 22 which comprises the second storage or memory device in the logic circuit. But, it will be recalled that the J–K flip-flop has been previously cleared, so that upon being enabled by an appropriate clock signal its condition and output will remain unchanged, i.e., it will remain a binary 0. Therefore, the true data bit in the form of a binary 0 has been transferred from the memory data register 20 to the second memory or storage device 22, a J–K flip-flop.

When it is desired to transfer the complement data bit from the memory data register 20 to the second memory or storage device 22, the J–K flip-flop 22 will be put into the set condition by the reception of an appropriate set signal over the input line as indicated in FIG. 2. As a result, the J–K flip-flop in this condition will provide a binary 1 output.

Assuming then, that the true output of the memory data register 20 is a binary 1, such binary 1 will be received by the AND gate 21 which, upon receiving an enabling signal over the main transfer bus from the memory data register, will provide a binary 1 output to the OR gate 23 which, in turn, will transmit the binary 1 input to both the J and K terminals of the J–K flip-flop 22. Upon being actuated by a clock signal, the J–K flip-flop will provide a change of state output because of the reception of a binary 1 signal at each of the J and K input terminals. Since the J–K flip-flop 22 was placed in a set condition providing a binary 1 output, and the binary 1 inputs change that state, a binary 0 output from the J–K flip-flop 22 will be generated. The binary 0 is, of course, the complement or false value of the true binary 1 input which was assumed as the output signal from the first memory or storage device, register 20.

On the other hand, however, if the true bit is a binary 0 generated out of the memory data register 20, the AND gate 21 will, upon being enabled, provide a binary 0 output which is passed through the OR gate 23 to be impressed upon both the J and K input terminals of the J–K flip-flop 22. It will be recalled that since the complement bit is desired the J–K flip-flop 22 was put in the set condition providing normally a binary 1 output. Since the inputs received at each of the J and K input terminals of the J–K flip-flop 22 is a binary 0, no change of state of the output signal or the condition of the J–K flip-flop 22 is caused. Therefore, the output of J–K flip-flop 22 upon its actuation by an appropriate clock signal will be a binary 1, which is the complement or false value of the binary 0 which is assumed to be the output of the first memory or storage device 20.

The second logic circuit illustrated in FIG. 2 comprising the elements 20*a* through 25*a* represent a second identical embodiment of the logic circuit of the present invention as it may be connected in parallel in a typical equipment to provide the true and complement transfer of multiple digital data, symbolically represented as N. Element 20*a* is a portion of the same first storage device, the memory data register or MDR 20 but handles bit N rather than bit K; similarly, element 22*a* is a part of the same A register as is element 22, handling bit N instead of bit K as does the former. It will be realized by those skilled and knowledgable in the art, that additional parallel logic circuits of any desired number may be connected in parallel between the first storage device, the memory data register, and a second storage device, the A register, to accommodate as many individual bits as the equipment requires.

It will be readily appreciated by comparison of the number and types of elements illustrated in FIG. 1 to those of FIG. 2, that the present invention is essentially "single rail" in concept while the prior art circuitry for accomplishing comparable results is essentially "double rail" in concept. Accordingly, the present invention eliminates a number of elements and many wiring connections as well. For example, in accordance with the concept of the present invention, the inversion gate 12 required in prior art logic circuits is eliminated, and similarly, the AND gate 14, as well as the AND gate 18. Accordingly, there is an elimination of a minimum of three gates per bit of digital data to be transferred which, in a 24 bit machine organization, would eliminate seventy-two gates. This would represent a saving of approximately eighteen microcircuit chips, assuming four two-input gates per chip.

Moreover, the speed of the data transfer is significantly enhanced by the elimination of the inverter gate 12 shown in FIG. 1. The J–K flip-flop employed in the present invention as shown in FIG. 2 is contained in one-half a microcircuit chip which is the same as the R–S flip-flop used for the A register of the conventional prior art logic circuit illustrated in FIG. 1.

Additionally, the present invention lends itself better to large scale integration (LSI) and medium scale integration (MSI) techniques because of the fewer number of gates and its inherent simplicity compared to the older prior art methods. As might be expected, both the reliability of operation, and maintainability of the logic circuits of the present invention incorporated in the computer equipment are enhanced due to the fewer number of microcircuit chips required. This advantage also holds true if LSI or MSI techniques are used due to the greater number of functions that can be accomplished on a single chip.

Those skilled and knowledgable in the art will readily appreciate the advantages of the present invention in achieving wholly comparable equivalent results and functions by the use of significantly lesser number of elements with many fewer wiring connections required and the inherent advantage of enhanced speed of operation because of the concept of the present invention.

Moreover, the concept of the present invention is such that it inherently requires a new method of employing and operating upon a J–K flip-flop for the storage of a binary bit in true or complement form as desired. The unique method involves the steps of putting the J-K flip-flop in the "clear" oe "set" conditions for storing the true or complement bit, respectively, by impressing an appropriate signal upon the "clear" or "set" terminal of the flip-flop; then, the true binary bit is impressed upon both the J and K terminals of the flip-flop, and thereafter the flip-flop is enabled by a suitable signal.

Obviously many modifications and variations of the present invention are possible in the light of the above teachings. It is therefore to be understood that within the scope of the appended claims the invention may be practiced otherwise than as specifically described.

What is claimed is:

1. A logic circuit for the transfer of digital data from a first storage device to a second storage device in the form of true and complement binary bits comprising:

an AND gate connected to receive an output from said first storage device in the form of a binary bit;

a source of enabling signals connected as a second input to said AND gate;

a J-K flip-flop connected in said second storage device to receive each binary bit of said digital data;

means connecting the output of said AND gate as J and K input signals to said J–K flip-flop;

a source of signals connected to clear said J–K flip-flop when desired;

a source of signal connected to set said J–K flip-flop when desired; and a source of clock pulses connected to activate said J-K flip-flop for generating outputs responsive to its said input signals.

2. Means for the transfer of digital data including a plurality of circuits as claimed in claim 1 connected in parallel between said first and second storage device, each of said plurality of circuits carrying one bit of said digital data.

3. A circuit for the transfer of digital data as claimed in claim 1 wherein said means for connecting the output of said AND gate to said J-K flip-flop includes an OR gate for receiving additional signal data.

4. A circuit for the transfer of digital data as claimed in claim 1 wherein said first storage device is comprised of R-S flip-flops.

* * * * *